United States Patent
Anwar et al.

(12)

(10) Patent No.: US 6,702,404 B2
(45) Date of Patent: Mar. 9, 2004

(54) HYBRID ELECTROMAGNETIC/FRICTION ACTUATION SYSTEM

(75) Inventors: Sohel Anwar, Canton, MI (US); Kevin J. Pavlov, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 80 days.

(21) Appl. No.: 10/027,408

(22) Filed: Dec. 20, 2001

(65) Prior Publication Data

US 2003/0117012 A1 Jun. 26, 2003

(51) Int. Cl.[7] .................................................. B60J 8/64
(52) U.S. Cl. ........................ 303/152; 180/65.3; 188/162
(58) Field of Search .............................. 188/158–164; 303/20, 152, 155; 701/70, 93; 180/65.1–65.7

(56) References Cited

U.S. PATENT DOCUMENTS

| 5,003,483 | A |   | 3/1991  | Hedström          |         |
|-----------|---|---|---------|-------------------|---------|
| 5,015,040 | A |   | 5/1991  | Lin               |         |
| 5,187,433 | A |   | 2/1993  | Even              |         |
| 5,234,262 | A |   | 8/1993  | Walenty et al.    |         |
| 5,291,408 | A |   | 3/1994  | Thatcher          |         |
| 5,423,600 | A |   | 6/1995  | Riddiford et al.  |         |
| 5,476,310 | A |   | 12/1995 | Ohtsu et al.      |         |
| 5,511,859 | A |   | 4/1996  | Kade et al.       |         |
| 5,535,122 | A |   | 7/1996  | Wood et al.       |         |
| 5,611,606 | A |   | 3/1997  | Nell et al.       |         |
| 5,743,599 | A |   | 4/1998  | Henderson et al.  |         |
| 5,746,294 | A | * | 5/1998  | Lee               | 188/163 |
| 5,829,845 | A |   | 11/1998 | Maron et al.      |         |
| 6,122,588 | A | * | 9/2000  | Shehan et al.     | 701/93  |
| 6,142,581 | A |   | 11/2000 | Yamaguchi et al.  |         |
| 6,199,961 | B1|   | 3/2001  | Beck              |         |
| 6,213,572 | B1|   | 4/2001  | Linkner, Jr. et al.|        |
| 6,226,586 | B1|   | 5/2001  | Luckevich et al.  |         |
| 6,253,885 | B1| * | 7/2001  | Tsai et al.       | 188/158 |
| 6,286,637 | B1|   | 9/2001  | Park et al.       |         |
| 6,317,675 | B1|   | 11/2001 | Stölzl et al.     |         |
| 6,321,144 | B1|   | 11/2001 | Crombez           |         |
| 6,457,784 | B1| * | 10/2002 | Bohm et al.       | 303/155 |
| 6,485,111 | B2| * | 11/2002 | Suo et al.        | 303/20  |
| 6,550,871 | B1| * | 4/2003  | Bohm et al.       | 303/20  |
| 2002/0030408 | A1 | * | 3/2002 | Niwa et al.      | 303/152 |

FOREIGN PATENT DOCUMENTS

| GB | 1239489      | 7/1971  |
|----|--------------|---------|
| JP | 58-107081 A  | 6/1983  |
| JP | 08-142822 A  | 6/1996  |
| SU | 1525499 A1   | 11/1989 |

* cited by examiner

*Primary Examiner*—Christopher P. Schwartz
(74) *Attorney, Agent, or Firm*—Brinks Hofer Gilson & Lione

(57) ABSTRACT

An actuation system controls the flow of electric power to electromagnetic actuators to control motion or movement of at least two shafts or bodies. The system is preferentially applied to braking systems in automobiles and trucks, and may also be applied to other areas, including clutches and drive systems for other power transmission purposes. The electromagnetic retarders may also be used in combination with friction brake systems. Principal advantages of the combination system are the reliability and simplicity of friction and hydraulic components, and the lower wear and longer life of electromagnetic components.

20 Claims, 11 Drawing Sheets

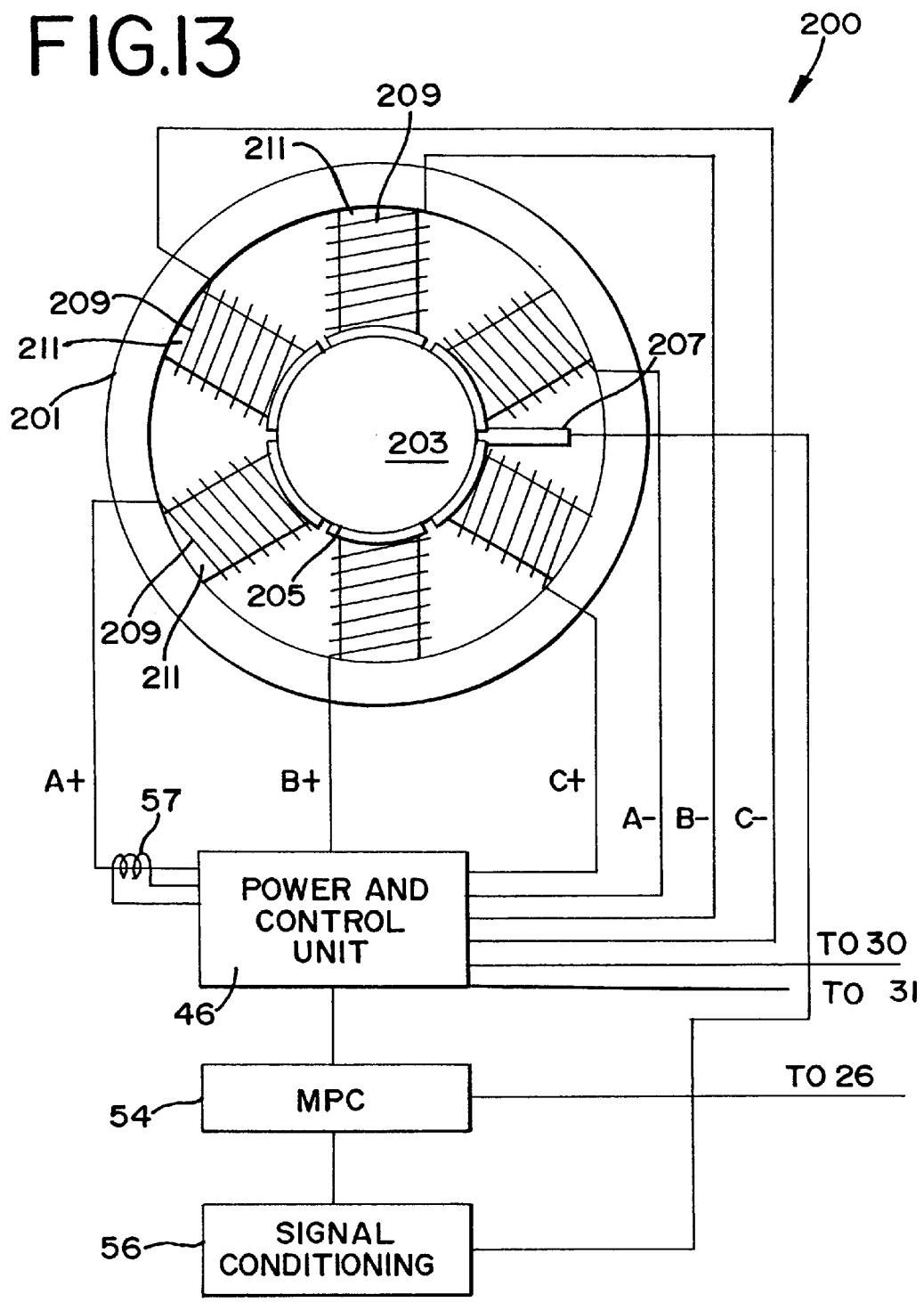

HYBRID ELECTROMAGNETIC/FRICTION ACTUATION SYSTEM

BACKGROUND OF THE INVENTION

Control of power transmission and torque is a frequent problem in many fields of application. In automobiles and trucks, clutches and brakes are used to transmit torque, or to accelerate or decelerate a vehicle. Normal wear on the friction components of these systems results in periodic and expensive repairs in countless applications not only in the United States, but worldwide wherever such systems are used.

Friction systems for deceleration typically used are one of two types: drum systems with traditional wear pads, or disc systems with a friction rotor/stator arrangement. Both types have wear components that must periodically be checked and replaced. Failure to check and repair or replace worn components can result in damage to the actuation system, such as warped rotors or wearing by application calipers directly on drums or other components. Such systems are also typically equipped with hydraulic systems for easier application and control. While the hydraulic systems make application easier, hydraulics do nothing to ease the wear situation and may indeed aggravate the wear on these systems by more aggressive application and use. The net result of these systems is to convert kinetic energy from wheels and axles into heat in the brake pads or discs, which then suffer further wear.

As a result of the deficiencies of these systems, electromagnetic retarders have been used for braking and deceleration systems. The concept behind electromagnetic retardation is to use an electric motor as an eddy current machine, that is, to retard the rotation of a rotor by applying a reluctance on a matching stator. The energy so used may recharge a battery (as in a regenerative braking system) or may be dissipated as heat if the application requires converting a large amount of kinetic energy (torque) to electrical energy or heat. Such a system may not always convert braking energy to another useful form of energy, but it may work for its intended primary purpose: stopping motion of a car, a truck or other moving or rotating body.

Present systems using electromagnetic retarders do not consider the effect of braking on the entire vehicle or body, but tend to consider only an individual wheel or other moving unit. For example, U.S. Pat. No. 5,743,599 reveals an electromagnetic retarding system for a vehicle in which there is an electromagnetic retarder for each wheel, but no consideration of the overall effect on the entire vehicle. Such a system may work for each wheel individually, but provides no balancing mechanism for the automobile or car employing the electromagnetic retarding system. For instance, electromagnetic retarders lose their effectiveness at low speeds, since little torque is available for conversion at low speeds. In some instances, torque may be available at one wheel or moving portion but not at another wheel or another portion of the vehicle employing the retarding system. As a result, the electromagnetic actuation system may not have the ability to control those retarders at which energy or torque is not otherwise available. What is needed is a way to balance the energy-conversion or torque-conversion needs of the entire vehicle or device using an electromagnetic retarding system. What is needed is a better way to control an electromagnetic retarding system to decelerate a vehicle or other moving object.

BRIEF SUMMARY OF THE INVENTION

The present invention meets this need with an electromagnetic retarding system. One aspect of the invention is an electromagnetic retarding system comprising a plurality of electromagnetic retarders, each retarder operably connected to a rotating shaft. The electromagnetic retarding system also comprises a sensor for measuring at least one of a speed and a torque of the shaft. There is a brake controller receiving inputs from the sensors, the controller controllably connected to each of the plurality of magnetic retarders, and means for supplying power to each of the electromagnetic retarders, the means controllably connected to the controller. In this aspect, the controller routes power to each of the plurality of electromagnetic retarders to oppose the rotating shafts connected to each retarder, and the power routed to each retarder depends on an error signal between an actual and a desired amount of at least one of a speed and a torque set by the controller for each of the plurality of retarders.

Another aspect of the invention is an electromagnetic retarding system for a motor vehicle. The electromagnetic retarding system comprises an electromagnetic retarder operatively coupled to each axle of the motor vehicle, and a sensor operably connected to each axle to indicate at least one of an axle speed and an axle torque. There is a power source or sources providing power for the electromagnetic retarders, and at least one sensor operably connected to a brake pedal of the vehicle for indicating at least one of a brake pedal displacement and a brake pedal force. The electromagnetic retarding system also comprises a controller in operable communication with the electromagnetic retarders, the sensors, and the power source or sources. In this electromagnetic retarding system for a motor vehicle, the controller applies power from the power source or sources to the electromagnetic retarders to decelerate the vehicle. The controller controls the application of the power by using at least one of a wheel speed, an axle torque, a brake pedal displacement, a brake pedal force, and a temperature.

Another aspect of the invention is a method for decelerating a moving object having at least two rotating shafts. The method comprises providing an electromagnetic retarding system for each rotating shaft. The method also comprises indicating for each shaft at least one of an actual deceleration, a desired deceleration, an actual torque and a desired torque, and then calculating a retarding force for each shaft. The method then applies an electromagnetic retarding force to each shaft, wherein the force applied to each shaft is dependent on at least one of a difference between the actual and the desired deceleration, and the actual and the desired torque of the shaft.

Yet another aspect of the invention is a method of braking a motor vehicle. The method provides an electromagnetic retarding system for providing a braking force to each axle of the motor vehicle. The method then indicates an actual parameter and a desired parameter for each axle, the parameter selected from the group consisting of torque and deceleration. For vehicles having dual wheels/tires, a single indicator for a pair or for four wheels on a shaft or an axle is sufficient. The method then calculates a braking force for each wheel or axle of the vehicle, and then applies the braking force to each axle of the vehicle via one or more electromagnetic retarders. The force applied to each axle is dependent on the difference between the actual and the desired parameter. The applied torque is also a function of the power available from the power source.

There are many aspects and embodiments of the invention, many of which will become clearer from the accompanying drawings and descriptions.

BRIEF DESCRIPTION OF SEVERAL VIEWS OF THE DRAWINGS

FIG. 13 is another embodiment of an electromagnetic retarding system for a vehicle using 3-phase current and a 3-phase retarding system.

DETAILED DESCRIPTION OF THE PRESENTLY PREFERRED EMBODIMENTS OF THE INVENTION

Figure 1:
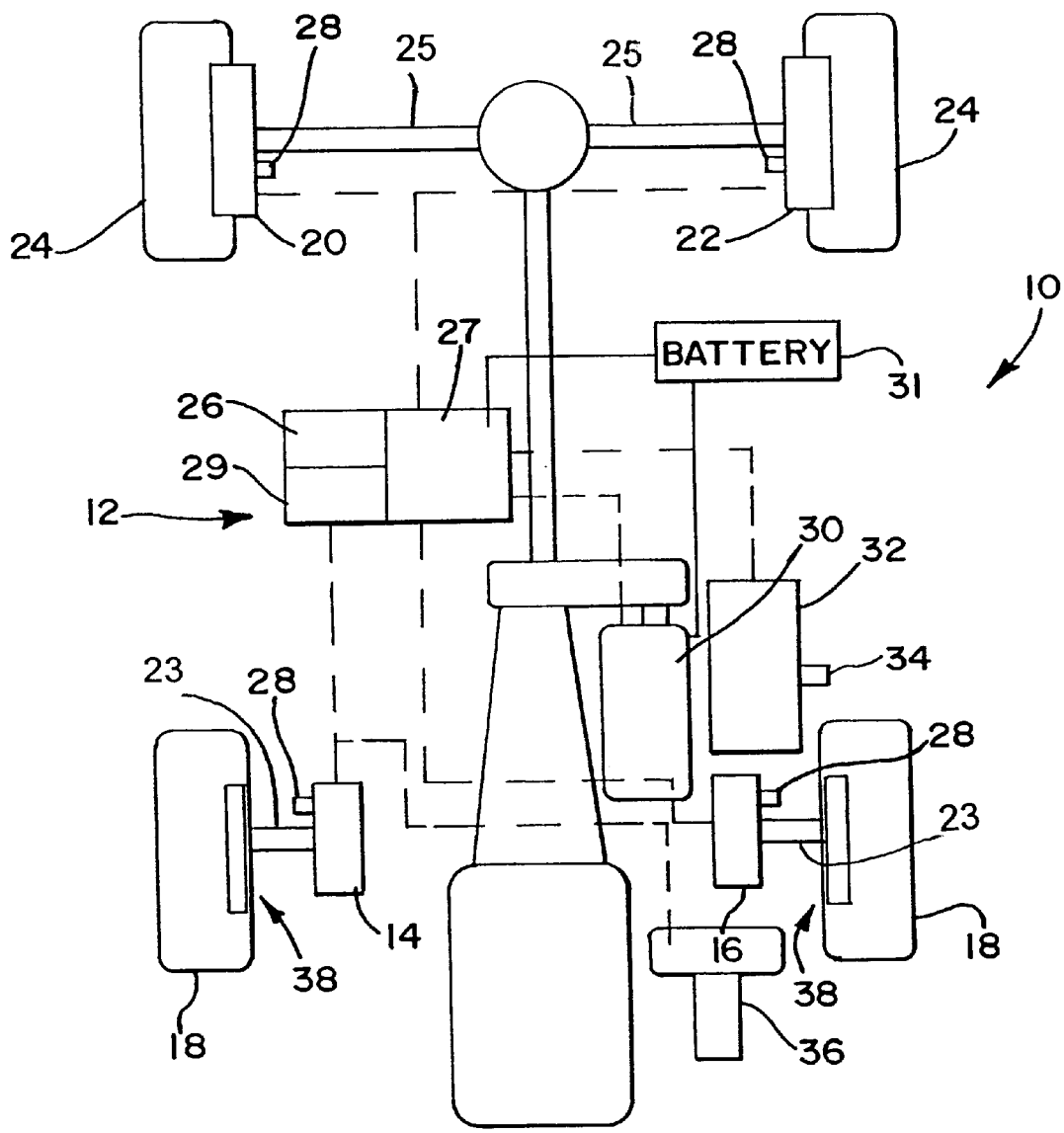
FIG. 1 is a schematic view of an automobile having a hybrid friction/electromagnetic braking system in accordance with the present invention.

FIG. 1 depicts a vehicle 10 having an electromagnetic retarding system 12 for all four wheels, and a friction brake system 13 for the front wheels only. An electromagnetic retarding system 12 for all four wheels includes retarders 14, 16 for front wheels 18 and retarders 20, 22 for rear wheels 24. Controller 26 controls the retarding system by receiving signals from the sensors 28 which are in controllable communication with the controller. Each wheel sensor gives a reading indicative of the wheel speed for the wheel to which it is nearest. As is well known in the art, such sensors may be photoelectrically or mechanically actuated rotational sensors, or may be magnetic pick-up speed sensors. The sensor may indicate wheel rotational speed or axle rotational speed for the axle that turns the wheel. In addition to wheel speed sensors, the vehicle is equipped with an active brake pedal 32 and at least one pedal sensor 34. The brake sensor 34 indicates a level of pedal force desired by an operator or by a brake control for the vehicle. The level of pedal force desired is preferably indicated by a sensor measuring the force with which a user applies the brake, or the sensor may measure the distance traveled by a brake pedal. What is needed is a measure of the relative intensity of the pedal force required by the vehicle braking system.

The brake controller 26 may control more than the electromagnetic retarding system. The controller 26 may include an anti-lock braking system, or other conventional braking control system for calculating a desired wheel torque for each wheel of the vehicle, and also calculating a desired wheel torque over a period of time for a desired deceleration for each wheel. The controller may preferably have a deceleration system power management controller or controller portion 29, described below. The vehicle may also have a power electronics section 27 for controlling the vehicle generator and battery, and also for performing any power conversion or correction needed by the electrical system. The power electronics section may include current controls, voltage regulation, an AC-to-DC power converter, a DC-to AC inverter, and/or a DC—DC power converter.

In addition, the vehicle 10 may have a friction braking system 13 for some or all of the wheels of the vehicle. The embodiment of FIG. 1 has a friction brake 38 for the front wheels 18 only of the vehicle. A friction braking system is used as an additional safety measure to help slow the vehicle. While electromagnetic braking systems are very reliable, they depend on generating torque at each wheel of the vehicle where a stopping force is needed, and the torque available at low speeds may not be sufficient in all instances to stop a vehicle as quickly as desired. Therefore, it may be desirable to include friction brakes on at least a portion of the wheels of a vehicle for emergency or very low speed stopping.

In one embodiment of the invention, an electromagnetic retarding system 12 is applied to a motor vehicle, such as a car or a pick-up truck. The system includes a 42V electrical generator or alternator 30. An alternator 30 may be a three-phase alternator generating three-phase AC power, or may have a greater number of phases. The vehicle may also include 42V battery 31, and power electronics 27 to control 42V DC power for electromagnetic retardation. The wheel shafts or half-axles 23, 25 for wheels 18 and 24 are each equipped with a 42V electromagnetic retarder, in this case each retarder 14, 16, 20, 22 having a stator and a rotor, the rotor mounted on the axles or half-shafts of the vehicle. The rotors may be made of magnetic material, such as AISI 1010 steel, for greater interaction with the reluctance generated by the stator during retardation braking. There is a 12V active booster available for the front wheels, and the front wheels are also equipped with standard disc friction brakes. The friction brake system is equipped with a pressure transducer on the master cylinder, communicably connected to the brake controller. Each wheel is equipped with a speed sensor 28 for sending a wheel speed voltage signal to a retarder controller 29 through a signal conditioner, which controls the electromagnetic retarding system as well as the active booster and the friction brakes. The brake pedal is equipped with a pedal force sensor or a pedal displacement sensor. In some embodiments, there is also a 12V battery or a 36V battery for the active pedal system.

In use, the controller receives inputs from the speed, pressure, and brake pedal sensors, and calculates the torque available at each wheel or shaft. The controller determines the desired deceleration based on an algorithm suitable for brake controllers, such as an anti-lock brake algorithm, or other control scheme. The controller uses this desired deceleration to calculate a torque to apply to each axle or wheel through the electromagnetic retarding system. The wheel speed or shaft speed may also be converted to an actual deceleration or an actual torque using a look-up table, as in FIG. 2, or other known means for calculating deceleration and torque. The control algorithms for re-calculating and maintaining the desired torque are described below.

Figure 2:
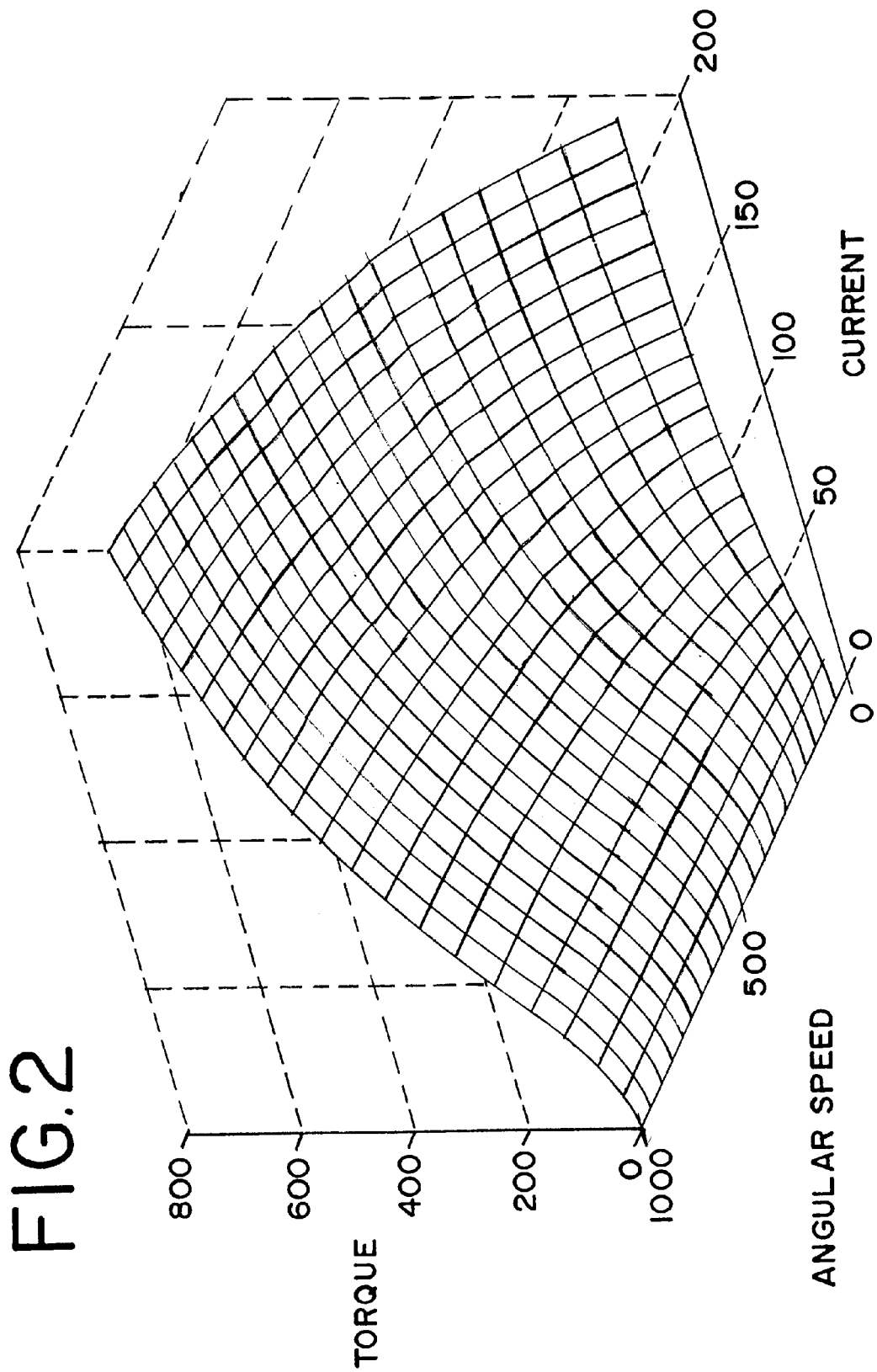
FIG. 2 is a graphical representation of the torque characteristics of an electromagnetic retarder.

FIG. 2 illustrates the torque characteristics of electromagnetic retarders, as are known in the vehicle and automotive arts. The torque available at a wheel or on a shaft rotating with the wheel depends on the rotational or angular speed of rotation. The shaft acts as the rotor in an electromagnetic retarder, and the electromagnetic retarder also includes a stator around the shaft/rotor, for establishing a reluctance that opposes the motion of the rotor. The stator receives electrical energy from a battery or a generator onboard the vehicle. Electrical power generated by the generator may be converted and stored in the battery. The electrical power applied at the retarder(s) may be dissipated as heat, much as the kinetic energy dissipated by friction braking systems is also dissipated as heat. The graph of FIG. 2 shows that an electromagnetic retarder will have more available torque at higher angular or rotational speeds, and will also have more torque available when it is dissipating more heat as electrical current.

Figure 3:
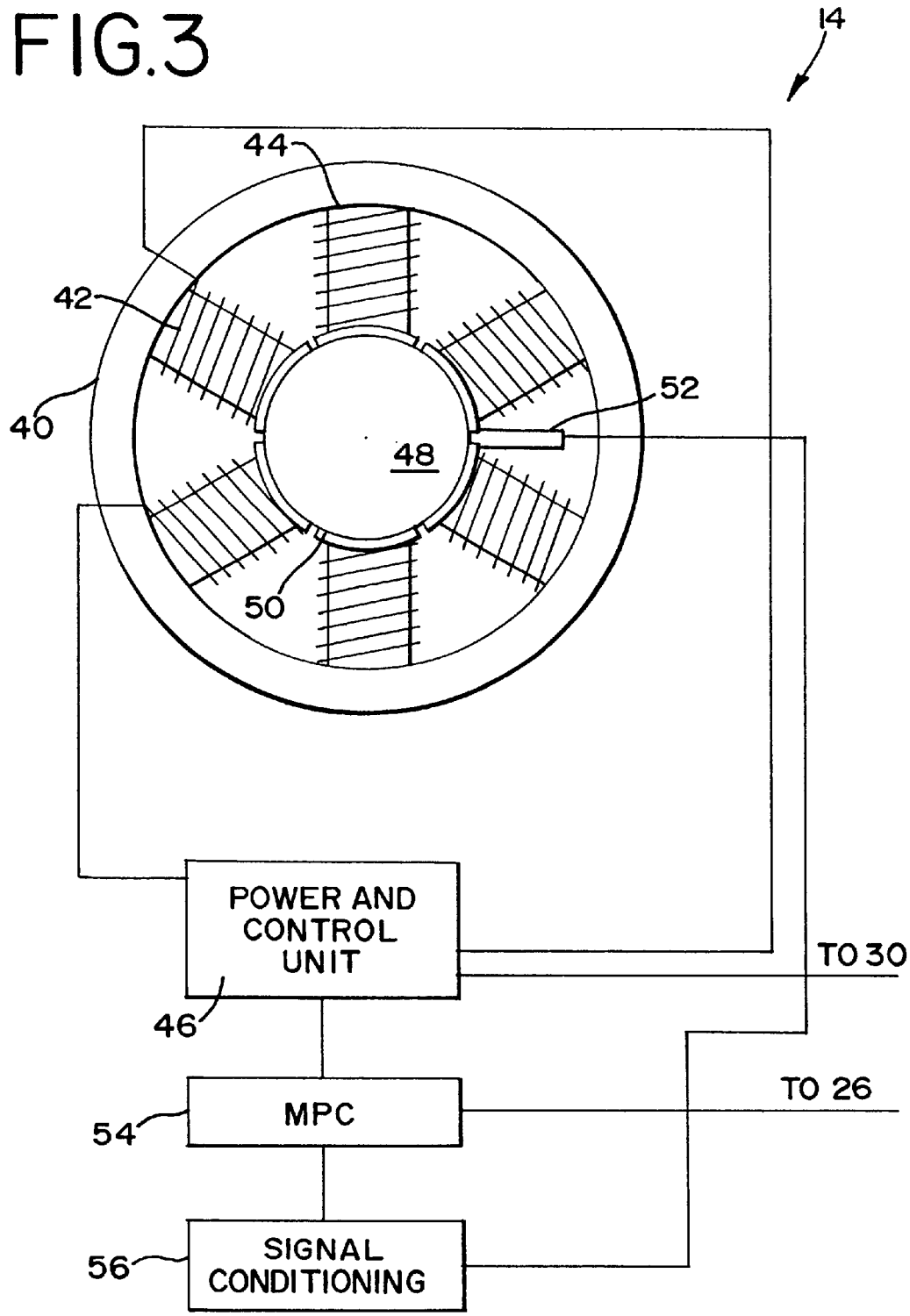
FIG. 3 is a schematic view of a retarder for use in an automotive braking system.

Hardware from an electromagnetic retarder 14 is depicted in FIG. 3. The retarder includes a stator 40 having a number of poles 42 with windings 44 around the poles and connected to a source 46 of electrical power. The rotor 48 of the electromagnetic retarder is mounted on shaft 50, such as an axle or half-axle transmitting power to a wheel. There is preferably a speed sensor 52 for measuring a rotational speed of the shaft/rotor 50 and conveying a signal indicative of the speed to a microprocessor controller 54 or signal conditioning unit 56. The microprocessor controller 54 may be in addition to the brake controller 26 for the vehicle, and the microprocessor controller 54 or signal-conditioning unit 56 may also receive signals indicative from current sensors 57 on the windings of stator 40 for determining the electrical performance of the retarder.

The present invention is meant to complement rather than replace a braking system used to slow a motor vehicle such as a car or a truck. Alternatively, the present invention may be used as an actuation system to control motion or rotation of multiple shafts in a stationary system in which the "braking" desired is to control the rotational speed of a shaft rather than the linear motion or speed of a vehicle. For instance, many vehicles presently use braking systems or anti-lock braking systems that are perfectly capable of performing the steps needed to stop a vehicle in a desired time and distance. However, present day vehicles depend on friction elements, as mentioned above, such as disc or drum brakes to convert the kinetic energy to heat. In the process, the friction elements wear and must be replaced. While this aspect of present-day brakes should be improved, the control systems, such as anti-lock brake controllers, need not be replaced. Rather, the friction elements need only be replaced by non-friction elements, such as electromagnetic retarders. If the stopping characteristics of the retarders are different from the presently-used friction elements, then the control algorithms used to apply electromagnetic retarders may be modified for desired performance. The control system may also convert periodic wheel speed or shaft speed readings to quantities and parameters such as deceleration and torque.

Figure 4:
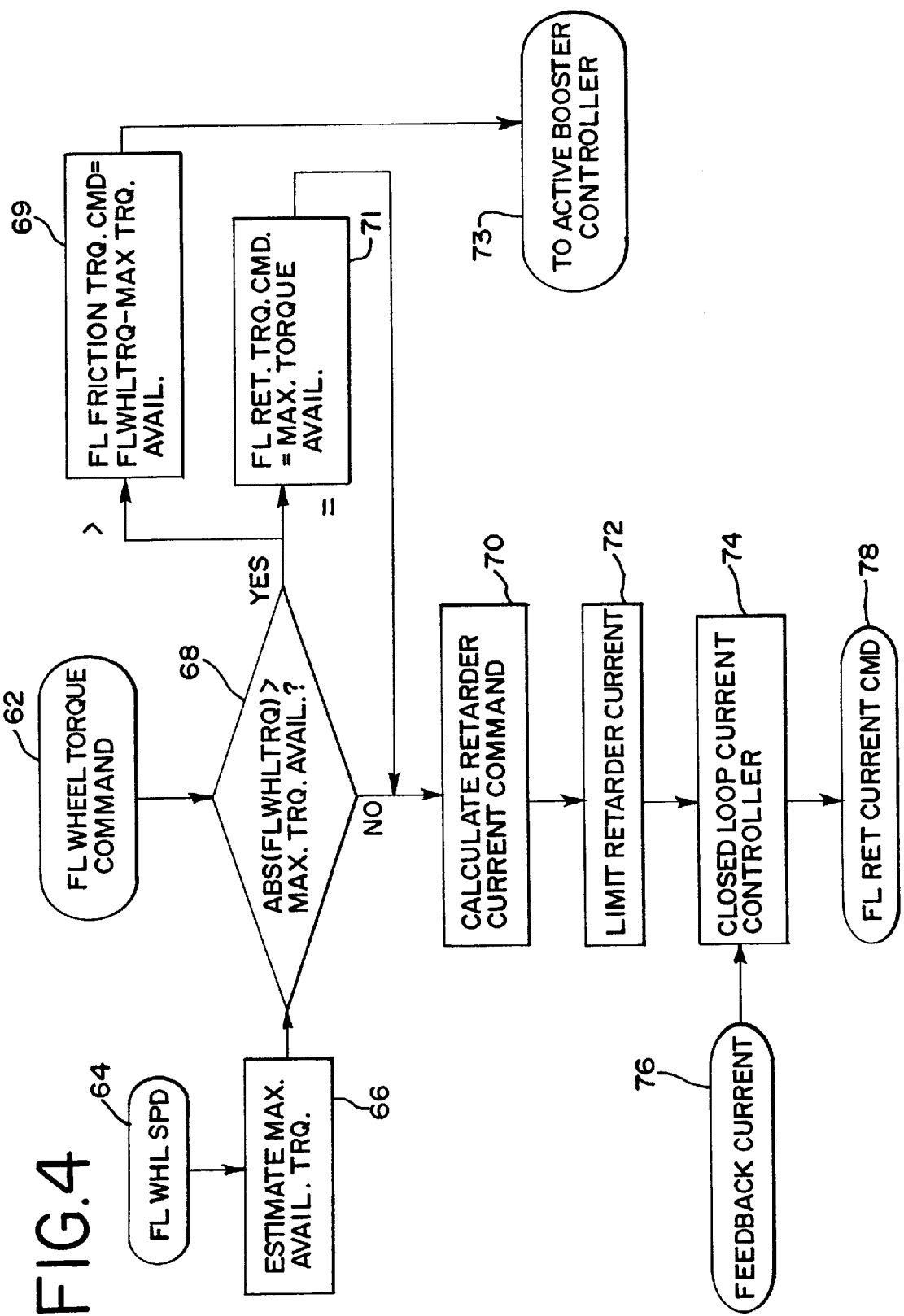
FIG. 4 is a control algorithm for a left front wheel of a motor vehicle according to the present invention.

FIG. 4 is an exemplary flow chart for a method of controlling the electromagnetic retarder brake on a left front wheel of the vehicle of FIG. 1. As described above, the brake controller 26 calculates a desired torque 62 for the left front retarder depending on the left front wheel speed 64 and the desired deceleration. Based on the left front wheel speed 64, the controller estimates 66 the maximum braking torque available at the left front wheel shaft. The controller may use a look-up table based on a chart of performance as depicted in FIG. 2. The controller then compares 68 the desired torque with the estimated maximum torque available at the left front wheel shaft. If insufficient braking torque is available, the left front wheel requires greater stopping power 69, and a command is sent to a source of greater stopping power, an active booster 73, which will be described below.

If the torque available at the left front shaft is greater than that required 68 or is equal to that required 71, the controller then calculates a current required to achieve braking torque 70. The controller may set a current limit 72 for the present braking action, and commence braking action with closed-loop current control 74, using current transformers or other current feedback 76 techniques. The method preferably includes periodic recalculation of the retarder current command needed, such as re-calculating every 10 msec or other effective interval in harmony with the vehicle brake control or ABS system. A new left front braking torque may then be calculated and the process repeats with a new desired torque or deceleration command and a new desired current command for the electromagnetic retarder.

Figure 5:
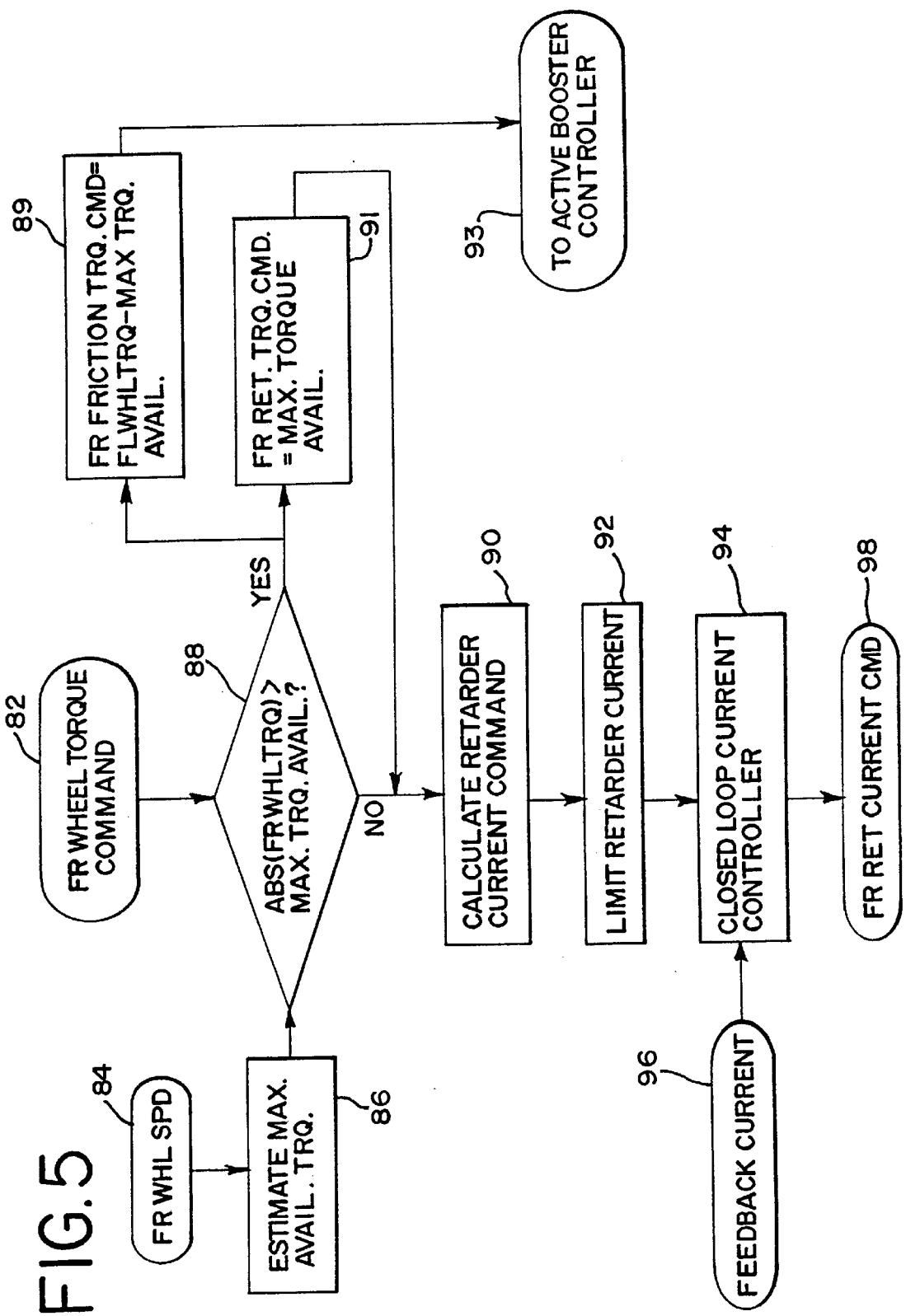
FIG. 5 is a control algorithm for a right front wheel of a motor vehicle according to the present invention.

The process operates in a very similar manner for the right front wheel, as shown in FIG. 5. A right front wheel torque command is calculated 82 based on the right front wheel speed 84 and the maximum available braking torque available at the right front wheel shaft. The required torque is compared 88 to the available torque. If the available torque exceeds 88 or equals 91 the required torque, then a current for the electromagnetic retarder for the right front wheel is calculated 90, a current limit may be set 92, and braking action commences with the electromagnetic retarder on the right front wheel, preferably using closed-loop current control 94 with current feedback 96, until a new right front current command is calculated 98. If the available braking torque is insufficient 89, then an amount needed by the active booster may be calculated 93.

Figure 6:
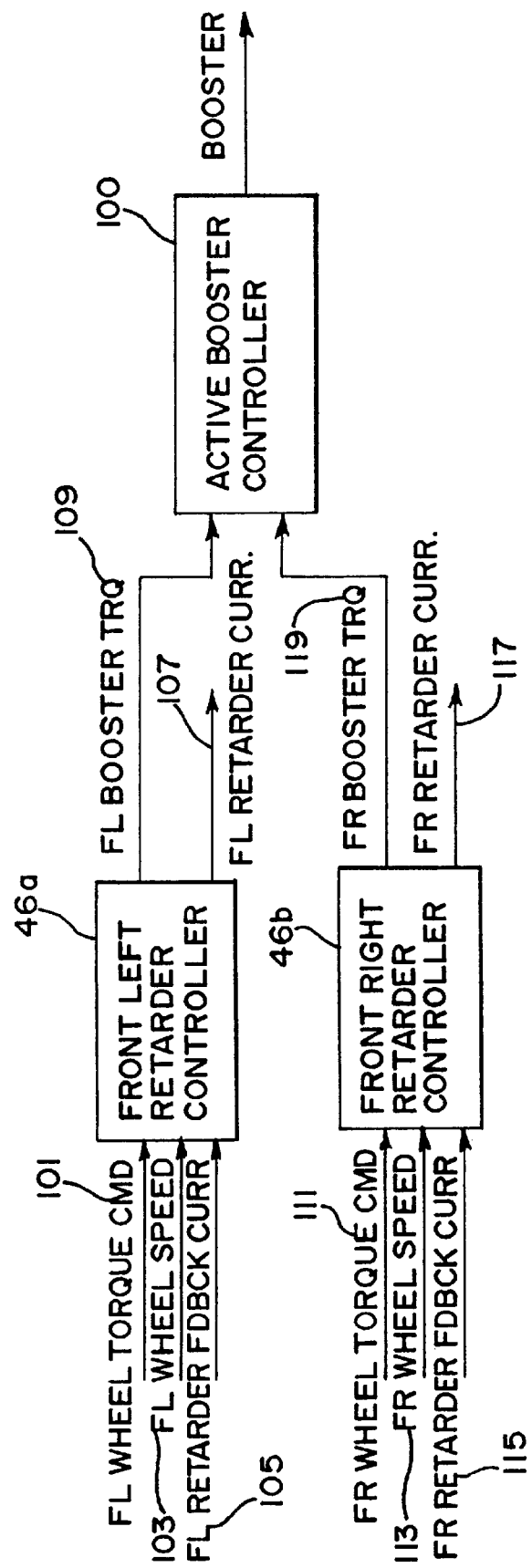
FIG. 6 is a schematic representation of a control scheme for an electromagnetic retarder in conjunction with an active booster.

The present system with the active booster is depicted in FIG. 6. The active booster in this embodiment is applied to the front wheels 18 of the vehicle, for improved control. As is well known, extra stopping power may as well be applied to the rear wheels of an automobile, but improved control results from front wheel drive and braking. As was noted in FIGS. 4 and 5, there may be driving situations in which the braking torque required to decelerate the wheel is greater than the torque available. The front left retarder controller 46a or the front right retarder controller 46b has inputs of the desired wheel braking torque command, the wheel speed, and, once braking action has commenced, a feedback current signal. The torque controllers 46a, 46b, then calculate a booster current 109, 119 needed to make up the deficiency between the retarder current 107, 117 and the available torque at the appropriate wheel, and the torque controllers then send a signal to the active booster controller 100 to make up the deficiency. Note in FIG. 2 that braking torque increases with increasing current for the same rotor speed.

If it is desired to keep retarder currents low, such as when the vehicle is moving slowly, the friction brakes may be used. In the embodiment of FIG. 1, the front wheels 18 of the vehicle 10 are equipped with friction brakes 38 under the control of the controller 26. In these braking events, the friction brakes, such as disc brakes or drum brakes, may be used in addition to the electromagnetic retarders.

Figure 7:
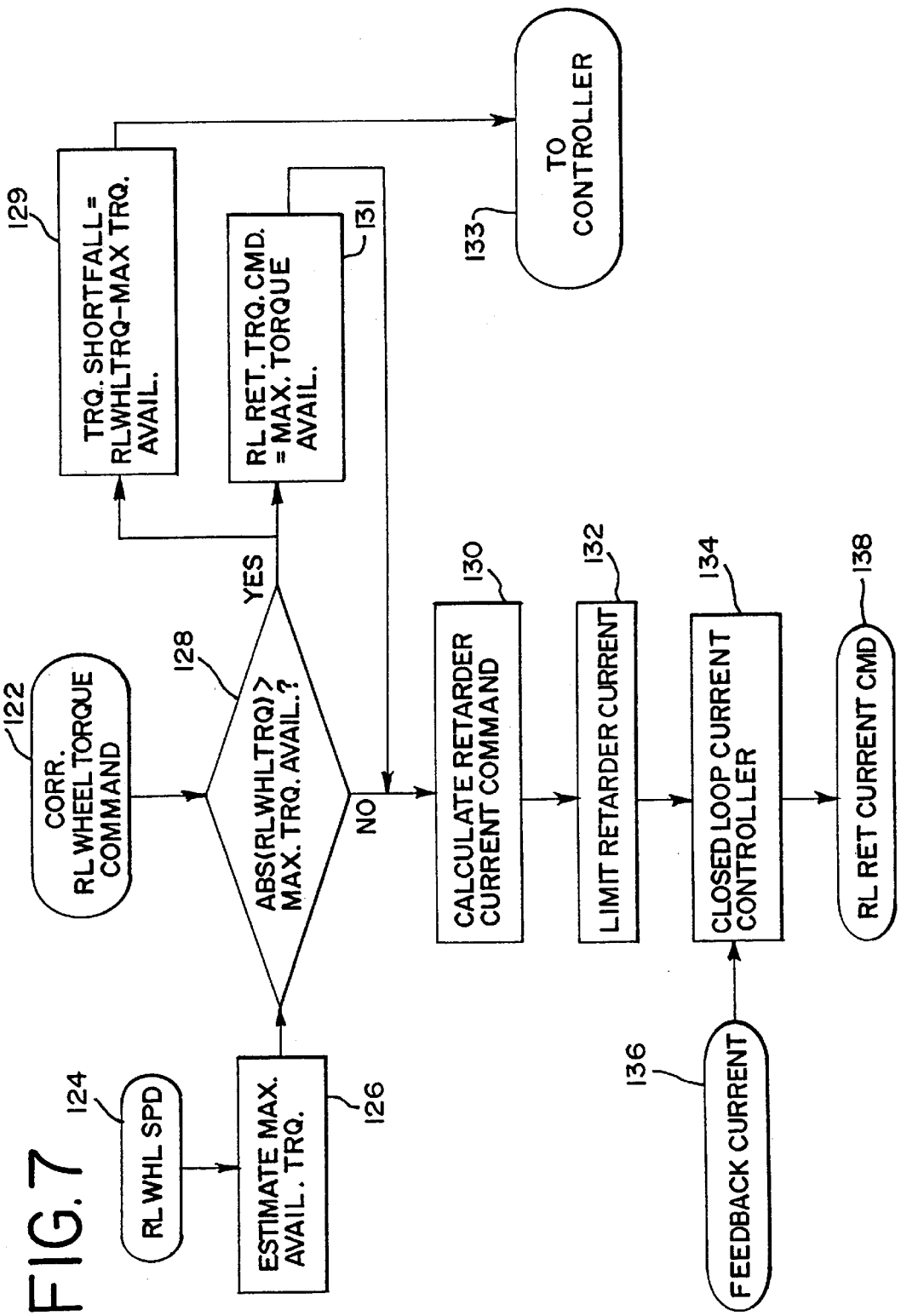
FIG. 7 is a control algorithm for a left rear wheel of a motor vehicle according to the present invention.
Figure 8:
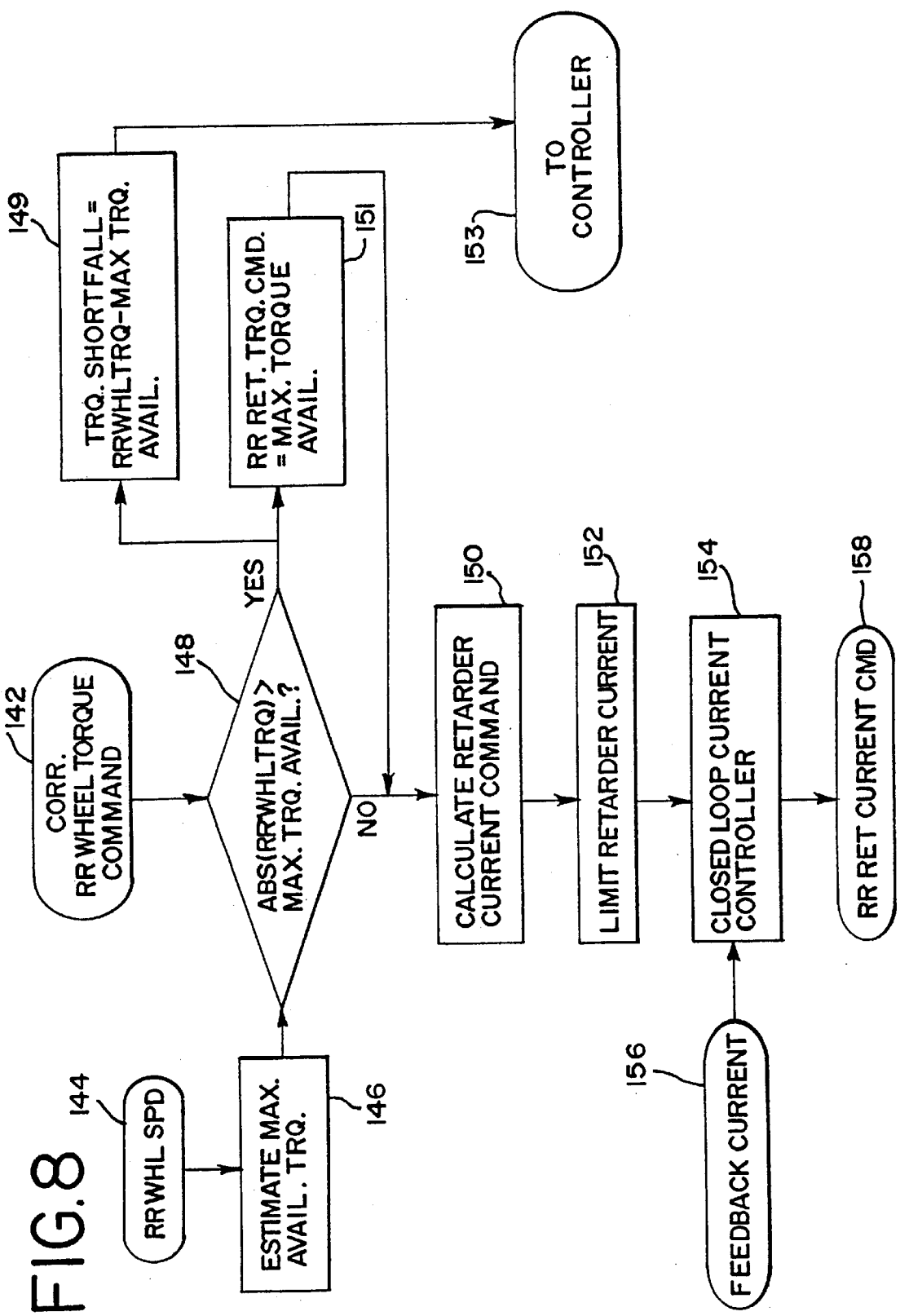
FIG. 8 is a control algorithm for a right rear wheel of a motor vehicle according to the present invention.

The electromagnetic retarders may also be used on the rear wheels of the vehicle, as depicted in FIGS. 7 and 8. In this embodiment, the rear wheels are not equipped with either friction brakes or an active booster, and instead depend on the current otherwise available to the retarders. If the available current is not sufficient, a signal is sent to the brake controller 26, and the current may be re-allocated among the wheels so that the desired braking torque is available.

FIG. 7 illustrates the algorithm for the left rear wheel. A torque command is calculated 122 based on the desired deceleration and an estimated maximum available torque at the left rear wheel is calculated 126 based on the wheel speed 124. The torque required is compared 128 with the torque available. If there is a shortfall 129, the controller is notified 133. If the available torque equals 131 or exceeds the requirement, a current command for the left rear retarder is calculated 130, and a retarder current limit may be set 132. A closed-loop current control 134 may be used for controlling the retarder, if current feedback 136 is available, as described above. A new left rear current command may be periodically calculated 138.

The same situation applies in FIG. 8 for the right rear wheel, with all numerals incremented by 20. Again, a torque command is calculated 142 based on the desired deceleration and an estimated maximum available torque at the right rear wheel is calculated 146 based on the wheel speed 144. The torque required is compared 148 with the torque available. If there is a shortfall 149, the controller is notified 153. If the available torque equals 151 or exceeds the requirement, a current command for the right rear retarder is calculated 150, and a retarder current limit may be set 152. A closed-loop current control may be used for controlling the retarder 154, if current feedback 156 is available, as described above. A new right rear current command may be periodically calculated 158.

If the left rear retarder or the right rear retarder has a shortfall of available torque, based on shaft speed, the controller may be notified 133, 153. In this case, the controller 26 may re-allocate current resources to meet the needs of the rear wheels in accordance with the torque/current/wheel speed relationships depicted in FIG. 2. With this method and apparatus, the sum of the currents from all four wheels may be summed and re-divided as needed, augmenting the rear wheel retarder current if necessary, and adding current to the front wheel retarders by the active booster, if necessary. In this manner, the braking power available at one or more wheels is not limited to one-fourth the total braking power available, but may be augmented as necessary by the vehicle battery, the vehicle generator, and even the friction elements if necessary.

Figure 9:
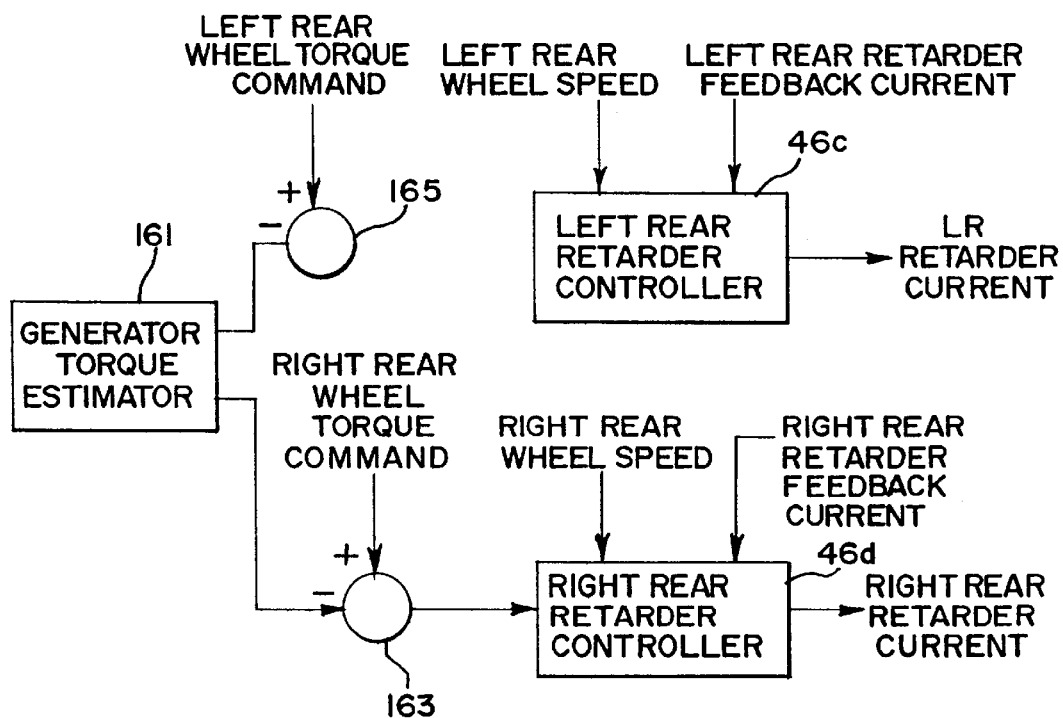
FIG. 9 is a schematic representation of a control scheme for rear wheels of a motor vehicle.

Feedback loops for the processes of FIGS. 4–5 and 7–8 are illustrated in FIG. 9. The electromagnetic retarder control system 26 calculates a torque estimate 161 based on retarder feedback current, wheel speed, and other pertinent factors, such as a generator feedback voltage. The corrected torque is then compared 163 with the current wheel torque command. The comparison takes place in the rear left retarder controller 46c or the rear right controller 46d. Information or signals indicative of the wheel speed, torque command, and feedback current are sent to the controller 46c, 46d. As shown above in FIGS. 4–5 and 7–8, a retarder current is calculated and the retarder controllers send commands, set points, and current limits, and the braking action continues.

Figure 10:
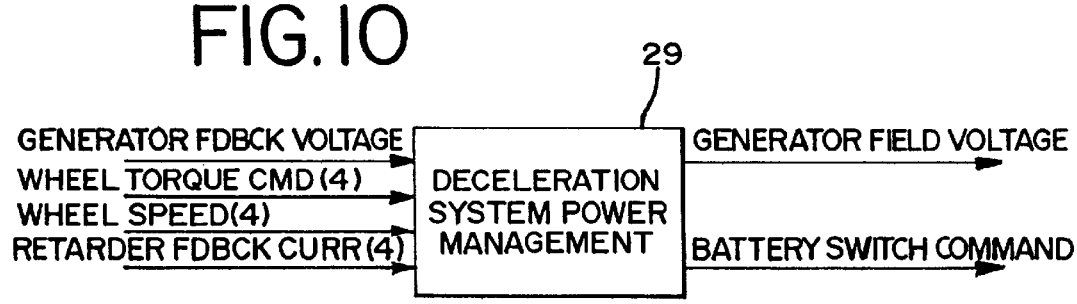
FIG. 10 is a schematic representation of a deceleration control system.

As shown in FIG. 10, the controller 26 may include a deceleration system power management controller 29 as well. The power management controller may be a separate controller or it may be a portion of brake controller 26. The power management controller preferably includes an algorithm or formula entered into the memory or hard-wired into the controller 26 or into a separate controller 29, such as a digital signal processor or other microprocessor. The power management controller should have inputs from the retarder controllers or directly from sensors in order to control outputs. The inputs should include retarder feedback currents, voltage feedbacks from one or more points, including the vehicle battery or batteries, generator or alternator or alternators. The power management controller 29 should also have outputs to control the flow of current from the current or voltage sources, such as the generator/alternator, as well as one or more batteries.

Figure 11:
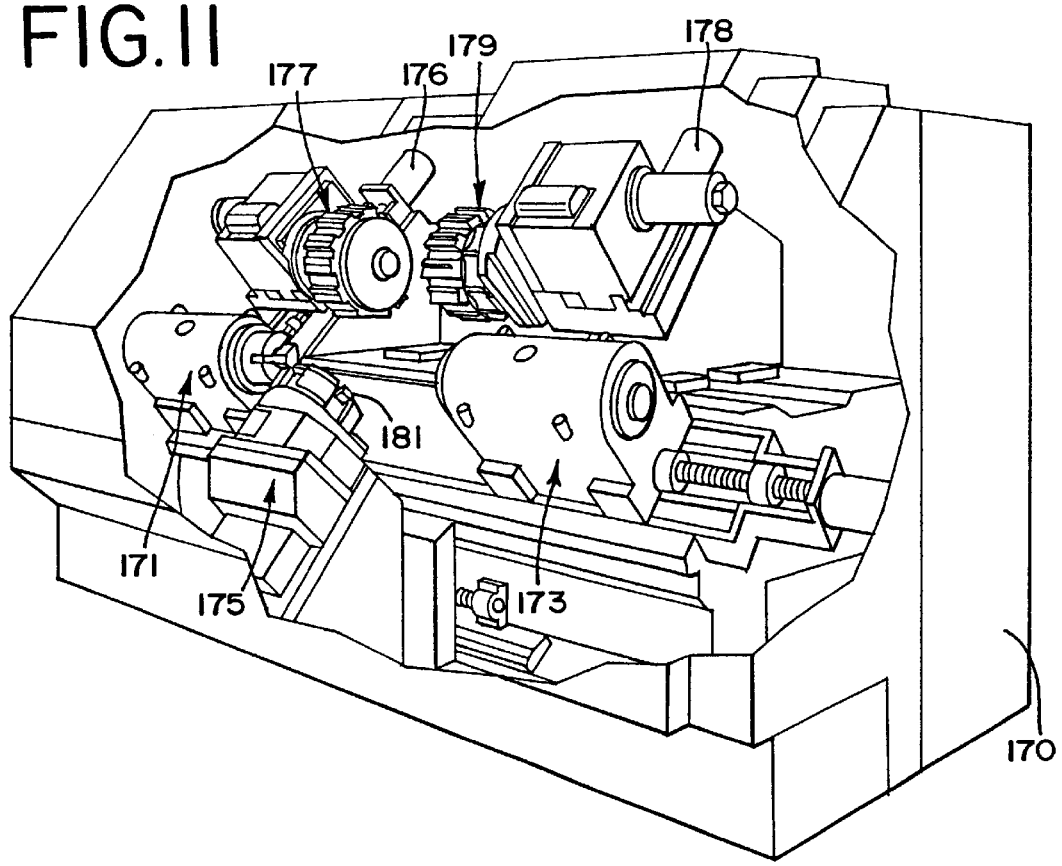
FIG. 11 is another embodiment of an actuation system using a braking system with an electromagnetic retarder.

While many applications for the electromagnetic retarders are found in the automotive and truck industries, other applications may use the invention as well. FIG. 11 depicts a machine tool 170 combining lathe functions with milling functions. In this machine tool, a workpiece is held in a generally horizontal position between the #1 spindle head 171 and the #2 spindle head 173. The workpiece is spun or revolved by motors connected to either or both spindle heads 171, 173. While the workpiece is spun, a tool or toolbit (not shown) is held or may be advanced in a direction generally perpendicular to the workpiece by any one of the cross-way spindles or turret heads 175, 177, 179. Each of these heads may hold a tool for shaping the workpiece while the workpiece is rotated. The tool is typically a metal or ceramic insert to remove metal from the workpiece. Some of the cross spindles 177, 179 may also be equipped with a motor 176, 178, for performing other operations on the workpiece, such as drilling or tapping.

Figure 12:
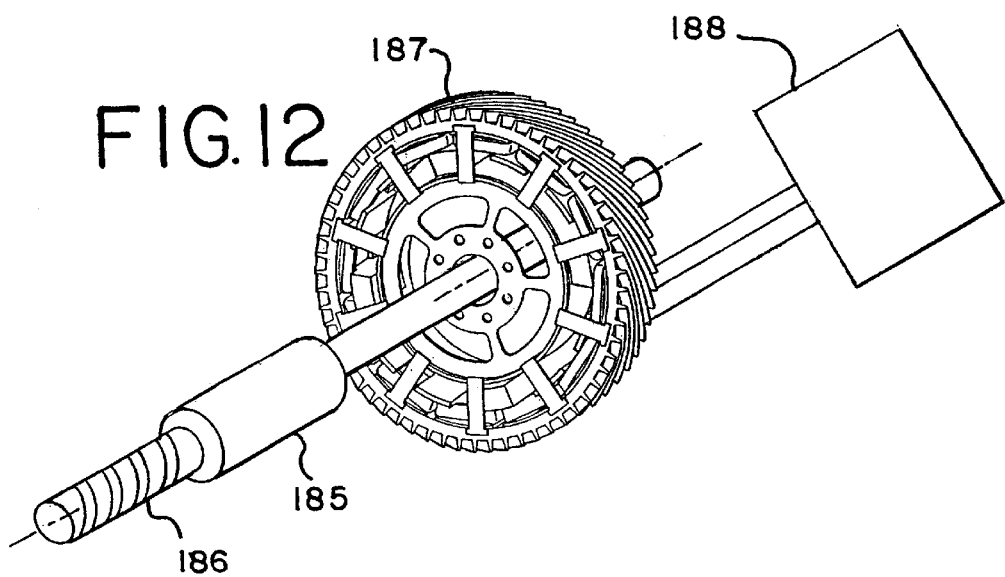
FIG. 12 depicts an isometric view of another embodiment of an electromagnetic retarder for stopping a shaft.

The spindles 171, 173, 177, 179 are analogous to the half-shafts in a motor vehicle, in the sense that an operator may wish to quickly stop one or more of the spindles, and not stop all of them at the same rate. The machine tool 170 may thus be equipped with electromagnetic retarders on each spindle for stopping rotation of the shaft that turns a tool. Included on each shaft is a sensor 181 for sensing rotational speed. The electromagnetic retarders, such as those depicted in FIG. 3, are then placed on each shaft (internal to the housings or covers shown in FIG. 11) along with a control system as described above. FIG. 12 depicts such a shaft 185 holding tool bit 186 for work perpendicular to a workpiece axis as it is held in place in the machine tool of FIG. 11. The shaft 185 is equipped with an electromagnetic retarder 187 receiver power from controller 188. The shaft or machine tool may also be equipped with a conventional stopping means, such as a friction brake system.

FIG. 13 depicts an alternate embodiment of an electromagnetic retarder 200 using a 3-phase AC retarder. The retarder includes a stator 201 having a number of poles 211 with windings 209 around the poles and connected to a power and control unit 46. The rotor 205 of the electromagnetic retarder is mounted on shaft 203, such as an axle or half-axle transmitting power to a wheel. There is preferably a speed sensor 207 for measuring a rotational speed of the shaft/rotor 205 and conveying a signal indicative of the speed to a microprocessor controller 54 or signal conditioning unit 56. The microprocessor controller 54 may be in addition to the brake controller 26 for the vehicle, and the microprocessor controller 54 or signal-conditioning unit 56 may also receive signals indicative of current signals on the windings of stator 201 for determining the electrical performance of the retarder. The controller can apply electrical energy generated in the generator 30 to a battery 31 on the vehicle when the retarder power demand is less than what generator can produce. Current feedback devices 57 may be used to measure the current used in the coil or coils. These devices may include current transformers, or other techniques, such as voltage drops, may also be used in current control operation of the electromagnetic retarders. In addition to resistive coil losses, retarders may be designed for maximum losses to eddy currents, such as revealed in U.S. Pat. No. 6,253,885, assigned to the assignee of the present invention, and incorporated by reference in its entirety.

The three-phase AC retarder 200 may also be used as an alternator during normal driving, since the axle acts as a rotor and may generate electricity as it rotates within wound stator 201. If the electronics within power and control unit 46 include a battery charger, the power and control unit may then also charge vehicle battery 31. The retarder is not limited to three-phases, and any number of phases, including single phase or other multiple phases, may also be used. Rotor 205 is preferably a permanent magnet rotor (also known in the automotive arts as a "brushless DC" rotor), or may be a rotor wound with coils for inducing a magnetic field. Rotor 205 is not limited to these embodiments and may also be made of a solid, non-magnetic material, or any other material useful for service as a magnetic retarder rotor or as a rotor for an electrical alternator.

Of course, it should be understood that the foregoing detailed description has been intended by way of illustration and not by way of limitation. Many changes and alternatives can be made to the preferred embodiments described above. For example, though it is preferred to use the various improvements described above in combination, they can also be used separately from one another. Furthermore, many of the improvements of this invention can be used with other types of shaft power. Since the foregoing detailed description has described only a few of the many alternative forms this invention can take, it is intended that only the following claims, including all equivalents, be regarded as a definition of this invention.

What is claimed is:

1. An electromagnetic retarding system, comprising:
   a plurality of electromagnetic retarders, each retarder operably connected to a rotating shaft;
   at least one sensor for measuring a quantity indicative of at least one of a speed and a torque of the shaft;
   a brake controller receiving inputs from the at least one sensor, the controller controllably connected to each of the plurality of electromagnetic retarders; and
   an electrical generator and battery for supplying power to each of the electromagnetic retarders, the means controllably connected to the controller,
   wherein the controller routes power to each of the plurality of electromagnetic retarders to oppose the rotating shafts connected to each retarder, and the power routed to each retarder depends on an error signal between an actual and a desired amount of at least one of a speed and a torque set by the controller for each of the plurality of retarders.

2. The electromagnetic retarding system of claim 1, further comprising means for indicating to the controller a desired rate of power for routing to each of the plurality of electromagnetic retarders.

3. The electromagnetic retarding system of claim 1, further comprising an active booster and at least two friction brakes connected to at least two of the shafts, said active booster and friction brakes controlled by the controller.

4. The electromagnetic retarding system of claim 1, wherein the generator is driveline mounted.

5. A method of braking a motor vehicle, the method comprising:
   providing an electromagnetic retarding system for providing a braking force to each axle of the motor vehicle;
   indicating an actual parameter and a desired parameter for each axle, said parameter selected from the group consisting of torque and deceleration;
   calculating a braking force needed for each axle of the vehicle; and
   applying the braking force to each axle of the vehicle via one or more electromagnetic retarders,
   wherein the force applied to each axle is dependent on the difference between the actual parameter and the desired parameter, and wherein power for the braking force is supplied from a generator and a battery.

6. The method of claim 5, further comprising applying a second braking force to at least two axles of the vehicle by a friction braking system.

7. The method of claim 5, further comprising storing power for sending to the electromagnetic retarders.

8. The method of claim 5, wherein the braking force is calculated using at least one of an axle speed, a wheel speed, a brake pedal force, a brake pedal displacement, an electromagnetic retarder current, and a temperature.

9. The method of claim 5, further comprising calculating a torque command to at least one axle of the vehicle using at least one of a speed and a current.

10. An electromagnetic retarding system for a motor vehicle, the system comprising:
    an electromagnetic retarder operatively coupled to each axle;
    at least one sensor for each axle operably connected to indicate at least one of an axle speed and an axle torque;
    a battery and generator providing power for the electromagnetic retarders;
    at least one sensor operably connected to a brake pedal of the vehicle for indicating at least one of a brake pedal displacement and a brake pedal force; and
    a controller in operable communication with the electromagnetic retarders, the sensors, and the power source,
    wherein the controller applies power from the power source to the electromagnetic retarders to decelerate the vehicle, the controller controlling said application of power using at least one of a wheel speed, an axle torque, a brake pedal displacement, a brake pedal force, and a temperature.

11. The electromagnetic retarding system of claim 10, further comprising a friction brake for at least two wheels of the motor vehicle, the friction brakes in controllable communication with the controller.

12. The electromagnetic retarding system of claim 11, further comprising an active booster source of power for the friction brakes.

13. The electromagnetic retarding system of claim 11, further comprising a vehicle brake control system in communication with the controller, wherein the vehicle brake control system and the controller cooperate to determine commands to decelerate the vehicle.

14. The electromagnetic retarding system of claim 10, further comprising a deceleration system power management controller.

15. A method of decelerating a moving object having at least two rotating shafts, the method comprising:
    providing an electromagnetic retarding system for each rotating shaft;
    indicating at least one of an actual deceleration, a desired deceleration, an actual torque and a desired torque, for each shaft;
    calculating a retarding force for each shaft; and
    applying an electromagnetic retarding force to each shaft, wherein the force applied to each shaft is dependent on at least one of a difference between the actual and desired deceleration, and a difference between the actual and desired torque of the shaft, and wherein a source of for the retarding force power is applied from a battery and a generator.

16. The method of claim 15, further comprising applying a friction braking force to at least one shaft.

17. The method of claim 15, further comprising generating and storing power for sending to the electromagnetic retarding system.

18. The method of claim 15, wherein the retarding force is calculated using at least one of a shaft torque, a shaft speed, a wheel speed, a deceleration force, a deceleration displacement, an electromagnetic retarding system current, and a temperature.

19. The method of claim 15, further comprising calculating a torque command to at least one electromagnetic retarding system using at least one of a speed and a current.

20. A hybrid electromagnetic/friction retarding system for a motor vehicle, the system comprising:

an electromagnetic retarder for each axle;

a sensor for each axle, said sensor providing a signal indicative of at least one of an axle torque, an axle speed, and a wheel speed;

at least one sensor operably connected to a brake pedal of the vehicle for indicating at least one of a brake pedal displacement and a brake pedal force;

a battery and a generator for providing and regulating power to the retarders;

at least one controller in controllable communication with the sensors, the retarders, and the power source; and a friction brake system for at least two wheels of the vehicle, the friction brake system in controllable communication with the at least one controller, wherein the controller applies power from the power source to the electromagnetic retarders to decelerate the vehicle, the controller controlling said application of power using at least one of a shaft speed, a wheel speed, a brake pedal displacement, a brake pedal force, and a temperature.

* * * * *

UNITED STATES PATENT AND TRADEMARK OFFICE
CERTIFICATE OF CORRECTION

PATENT NO. : 6,702,404 B2
DATED : March 9, 2004
INVENTOR(S) : Sohel Anwar et al.

It is certified that error appears in the above-identified patent and that said Letters Patent is hereby corrected as shown below:

<u>Column 9,</u>
Lines 33-34, delete ", the means controllably".

Signed and Sealed this

Twenty-fifth Day of May, 2004

JON W. DUDAS
*Acting Director of the United States Patent and Trademark Office*